(12) United States Patent
Zheng et al.

(10) Patent No.: US 11,650,140 B2
(45) Date of Patent: May 16, 2023

(54) PRESSURE-BEARING DEVICE AND SEALING METHOD FOR SIMULATING EXCAVATION UNLOADING TEST OF HIGH-ENERGY-STORAGE ROCK MASS

(71) Applicant: Changchun Puce Test Instrument Co., Ltd., Jilin (CN)

(72) Inventors: Bowen Zheng, Changchun (CN); Xin Wang, Changchun (CN); Qingze Hao, Changchun (CN); Libo Jiang, Changchun (CN); Daode Qu, Changchun (CN)

(73) Assignee: Changchun Puce Test Instrument Co., Ltd., Changchun (CN)

( * ) Notice: Subject to any disclaimer, the term of this patent is extended or adjusted under 35 U.S.C. 154(b) by 0 days.

(21) Appl. No.: 17/944,174

(22) Filed: Sep. 13, 2022

(65) Prior Publication Data

US 2023/0093113 A1 Mar. 23, 2023

(30) Foreign Application Priority Data

Sep. 17, 2021 (CN) .......................... 202111092101.2

(51) Int. Cl.
*G01N 1/36* (2006.01)
*G01N 3/02* (2006.01)
(Continued)

(52) U.S. Cl.
CPC ................. *G01N 1/36* (2013.01); *G01N 3/02* (2013.01); *G01N 3/08* (2013.01); *F16J 15/061* (2013.01);
(Continued)

(58) Field of Classification Search
CPC .. G01N 1/36; G01N 3/02; G01N 3/08; G01N 2203/0003; G01N 2203/0019; G01N 2203/0256; F16J 15/061
See application file for complete search history.

(56) References Cited

U.S. PATENT DOCUMENTS

| 7,536,921 B1 * | 5/2009 | Chu .......................... G01N 3/10 73/803 |
| 2021/0231520 A1 * | 7/2021 | Zhang ..................... G01M 3/06 |

FOREIGN PATENT DOCUMENTS

| CN | 201107238 Y | 8/2008 |
| CN | 202132500 U | 2/2012 |

(Continued)

*Primary Examiner* — Jonathan M Dunlap
(74) *Attorney, Agent, or Firm* — Bochner IP, PLLC; Andrew D. Bochner (57) ABSTRACT

Disclosed is a pressure-bearing device for simulating an excavation unloading test of a high-energy-storage rock mass. The pressure-bearing device comprises pressure-bearing blocks, a casing pipe and sealing rings, wherein the two pressure-bearing blocks are respectively arranged at two ends of a to-be-tested rock mass; the casing pipe can be arranged outside the to-be-tested rock mass and the pressure-bearing blocks in a sleeving mode and is attached to the to-be-tested rock mass and the pressure-bearing blocks; and the sealing rings are arranged outside the pressure-bearing blocks and the casing pipe in a sleeving mode, so that the sealing rings can be tightly pressed on the casing pipe and the pressure-bearing blocks through fastening elements. Further disclosed is a sealing method for simulating an excavation unloading test of a high-energy-storage rock mass.

20 Claims, 3 Drawing Sheets

(51) Int. Cl.
 *G01N 3/08* (2006.01)
 *F16J 15/06* (2006.01)
(52) U.S. Cl.
 CPC ............... *G01N 2203/0003* (2013.01); *G01N 2203/0019* (2013.01); *G01N 2203/0256* (2013.01)

(56) References Cited

FOREIGN PATENT DOCUMENTS

CN 211347653 U 8/2020
CN 112557135 A 3/2021

\* cited by examiner

PRESSURE-BEARING DEVICE AND SEALING METHOD FOR SIMULATING EXCAVATION UNLOADING TEST OF HIGH-ENERGY-STORAGE ROCK MASS

CROSS REFERENCE TO RELATED APPLICATION

This patent application claims the benefit and priority of Chinese Patent Application No. 202111092101.2, filed on Sep. 17, 2021, the disclosure of which is incorporated by reference herein in its entirety as part of the present application.

TECHNICAL FIELD

The present disclosure relates to the technical field of laboratory tests of rock mass mechanics, in particular to a pressure-bearing device and a sealing method for simulating an excavation unloading test of a high-energy-storage rock mass.

BACKGROUND ART

The engineering excavation unloading working condition of a high-energy-storage rock mass can be realized through a loading and unloading path of the conventional triaxial test of a laboratory rock mass. When the stress state of the high-energy-storage rock mass before excavation is simulated in a laboratory, high confining pressure needs to be applied to the rock mass, and the confining pressure value reaches dozens or even hundreds of megapascals. When the stress state in the excavation process is simulated, the high confining pressure of the rock mass is rapidly released. In order to ensure that test values are true and effective, hydraulic oil needs to be prevented from entering a rock mass sample in the loading and unloading test process of the laboratory, and particularly the condition that the hydraulic oil permeates into the rock mass sample in the loading and unloading test of the rock mass containing structural surfaces is easier to occur. In order to prevent hydraulic oil from contacting with the rock mass sample, sealing between the rock mass and a pressure head of a test system is very important.

At present, a sealing heat-shrinkable casing pipe and an auxiliary sealing accessory are used for sealing the rock mass and the pressure head of the conventional triaxial test, and two modes of electrical adhesive tape winding or metal ring hooping are mainly adopted. However, in the two modes, the test effect of the rock mass under the loading and unloading condition of dozens or even hundreds of megapascals of high confining pressure is poor. The patent with the publication number of CN211347653U discloses a sealing device and method suitable for a true triaxial test, so that the sealing reliability between a rock mass and a pressure head is enhanced. Although the sealing effect between the rock mass and the pressure head is good, for the large-size rock mass, the weight of the annular boss is large, and sealing operation of testers, particularly testers with small strength, is not facilitated. Moreover, after a high-confining-pressure loading and unloading test, the contact position of the pressure head and an oil cylinder is difficult to be instantly separated due to the existence of a hydraulic oil film, or disturbance can be generated to the rock mass after the test, so that the original state of the rock mass after the test is destroyed.

Therefore, how to change the current situation that the sealing effect of the rock mass and the pressure head is poor and the sealing operation is difficult in the process of the high-confining-pressure loading and unloading test in the prior art becomes a problem urgently needed to be solved by those skilled in the art.

SUMMARY

The present disclosure aims to provide a pressure-bearing device and a sealing method for simulating an excavation unloading test of a high-energy-storage rock mass to solve the problems in the prior art, so that the sealing effect of the rock mass and a pressure head in a conventional triaxial test is enhanced, and the sealing operation convenience is also improved.

In order to achieve the purpose, the present disclosure provides the following scheme. The present disclosure provides a pressure-bearing device for simulating an excavation unloading test of a high-energy-storage rock mass, comprising:

pressure-bearing blocks, the number of the pressure-bearing blocks being two, and the two pressure-bearing blocks being respectively arranged at two ends of a to-be-tested rock mass;

a casing pipe, the casing pipe being arranged outside the to-be-tested rock mass and the pressure-bearing blocks in a sleeving mode and being attached to the to-be-tested rock mass and the pressure-bearing blocks, and the casing pipe being made of a waterproof material; and sealing rings, the sealing rings being arranged outside the pressure-bearing blocks and the casing pipe in a sleeving mode, the sealing rings corresponding to the pressure-bearing blocks in a one-to-one mode, the abutting surfaces of the sealing rings, the casing pipe and the pressure-bearing blocks being inclined surfaces, fastening elements being further arranged between the sealing rings and the pressure-bearing blocks, the sealing ring being tightly pressed on the casing pipe and the pressure-bearing blocks through the fastening elements, and the sealing ring being made of a rigid material.

Preferably, the pressure-bearing block is provided with a first inclined surface, the first inclined surface extends from the first end, away from the to-be-tested rock mass, of the pressure-bearing block to the second end, close to the to-be-tested rock mass, of the pressure-bearing block, and the pressure-bearing block is obliquely arranged towards the axis direction of the pressure-bearing block; the sealing ring is provided with a second inclined surface, and the second inclined surface can abut against the first inclined surface and the casing pipe; and acting force can be applied to the sealing rings in the direction away from the to-be-tested rock mass through the fastening elements.

Preferably, a sealing groove is formed in the pressure-bearing block, an opening of the sealing groove is formed in the first inclined surface, a sealing ring is arranged in the sealing groove, and the sealing ring abuts against the second inclined surface.

Preferably, the pressure-bearing block is provided with a boss, the boss is arranged on the side, away from the to-be-tested rock mass, of the sealing ring, a gap is formed between the boss and the sealing ring, and the boss is connected with the sealing ring through the fastening elements.

Preferably, the fastening element is a bolt, through holes matched with the fastening elements are formed in the boss, bolt holes matched with the fastening elements are formed in the sealing ring, and the fastening elements penetrate through the boss and then are in threaded connection with the sealing ring.

Preferably, the number of the fastening elements is four, and the four fastening elements are circumferentially and uniformly distributed around the axis of the pressure-bearing block.

Preferably, a groove is formed in the radial end face of the end, away from the to-be-tested rock mass, of the pressure-bearing block, the groove is of a structure with an opening in the top, and the groove extends to the side wall of the pressure-bearing block.

Preferably, the groove is cross-shaped, and the cross-shaped connecting line of the four fastening elements coincides with the projection of the groove.

The present disclosure further provides a sealing method for simulating an excavation unloading test of a high-energy-storage rock mass, and the pressure-bearing device for simulating an excavation unloading test of a high-energy-storage rock mass is utilized.

The two pressure-bearing blocks are symmetrically arranged at two ends of the to-be-tested rock mass, the casing pipe is arranged outside the to-be-tested rock mass and the pressure-bearing blocks in a sleeving mode, the casing pipe is tightly attached to the to-be-tested rock mass and the pressure-bearing blocks, the sealing rings are arranged outside the pressure-bearing blocks and the casing pipe in a sleeving mode, and the sealing rings are tightly pressed on the casing pipe and the pressure-bearing blocks through the fastening elements.

Preferably, the pressure-bearing blocks and the to-be-tested rock mass are coaxially arranged.

Compared with the prior art, the present disclosure has the following technical effects. The pressure-bearing device for simulating an excavation unloading test of a high-energy-storage rock mass comprises pressure-bearing blocks, a casing pipe and sealing rings. The number of the pressure-bearing blocks is two, and the two pressure-bearing blocks are respectively arranged at two ends of the to-be-tested rock mass; the casing pipe can be arranged outside the to-be-tested rock mass and the pressure-bearing blocks in a sleeving mode and can be attached to the to-be-tested rock mass and the pressure-bearing blocks, and the casing pipe is made of a waterproof material; and the sealing rings are arranged outside the pressure-bearing blocks and the casing pipe in a sleeving mode, the sealing rings correspond to the pressure-bearing blocks in a one-to-one mode, the abutting surfaces of the sealing rings, the casing pipe and the pressure-bearing blocks are inclined surfaces, fastening elements are further arranged between the sealing rings and the pressure-bearing blocks, the sealing ring can be tightly pressed on the casing pipe and the pressure-bearing blocks through the fastening elements; and the sealing ring is made of a rigid material.

According to the pressure-bearing device for simulating an excavation unloading test of a high-energy-storage rock mass in the present disclosure, the casing pipe is arranged outside the to-be-tested rock mass and the pressure-bearing blocks in a sleeving mode to play a role in fixing the to-be-tested rock mass and the pressure-bearing blocks, then, the sealing rings are arranged outside the pressure-bearing blocks and the casing pipe in a sleeving mode, the casing pipe is tightly attached to the to-be-tested rock mass and the pressure-bearing blocks, namely, the sealing rings are arranged outside the pressure-bearing blocks and the to-be-tested rock mass in a sleeving mode, and the sealing rings can be tightly pressed on the pressure-bearing blocks, so that the end of the casing pipe is blocked, and the purpose of sealing is achieved. It needs to be emphasized that the sealing rings are tightly pressed on the pressure-bearing blocks through the fastening elements, the abutting surfaces of the sealing rings, the pressure-bearing blocks and the casing pipe are inclined surfaces, the pressure-bearing block abuts against the inclined surface of the sealing ring, the damage to the casing pipe caused by stress concentration at the contact position of the sealing ring and the pressure-bearing block is avoided, the sealing ring is guaranteed to be tightly attached to the casing pipe, and the sealing effect is enhanced. In addition, the sealing rings are promoted to be tightly pressed on the casing pipe and the pressure-bearing blocks through the fastening elements, and the operation convenience is improved.

Further disclosed is a sealing method for simulating an excavation unloading test of a high-energy-storage rock mass. By utilizing the pressure-bearing device for simulating an excavation unloading test of a high-energy-storage rock mass, the two pressure-bearing blocks are symmetrically arranged at two ends of the to-be-tested rock mass, the casing pipe is arranged outside the to-be-tested rock mass and the pressure-bearing blocks in a sleeving mode, the casing pipe is tightly attached to the to-be-tested rock mass and the pressure-bearing blocks, the sealing rings are arranged outside the pressure-bearing blocks and the casing pipe in a sleeving mode, and the sealing rings are tightly pressed on the casing pipe and the pressure-bearing blocks through the fastening elements. The sealing method for simulating an excavation unloading test of a high-energy-storage rock mass is convenient to operate, time-saving and labor-saving, so that the adaptability and reliability of the conventional triaxial test are improved.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 1, pressure-bearing block; 101, first inclined surface; 102, boss; 103, sealing groove; 104, groove; 2, sealing ring; 201, second inclined surface; 3, to-be-tested rock mass; 4, fastening element; and 5, sealing ring.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a pressure-bearing device and a sealing method for simulating an excavation unloading test of a high-energy-storage rock mass to solve the problems in the prior art, so that the sealing effect of the rock mass and a pressure head in a conventional triaxial test is enhanced, and the sealing operation convenience is also improved.

To make the foregoing objective, features and advantages of the present disclosure clearer and more comprehensible, the present disclosure is further described in detail below with reference to the attached figures and specific embodiments.

Figure 1:
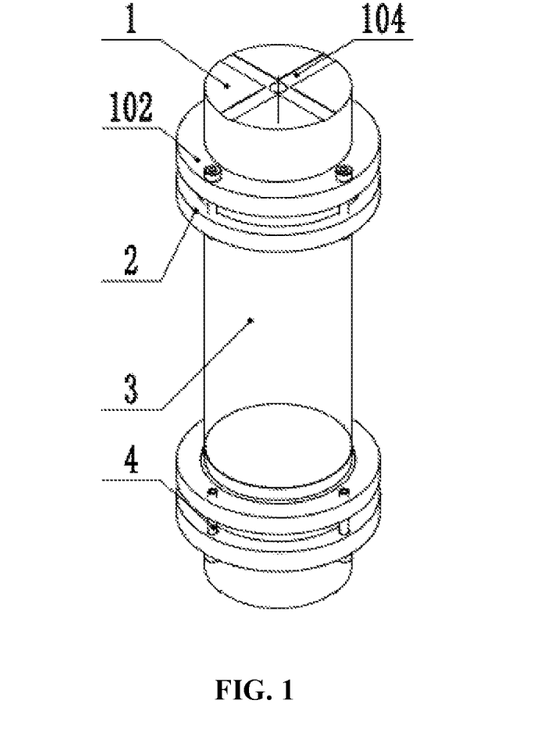
FIG. 1 is an axonometric schematic diagram of a pressure-bearing device for simulating an excavation unloading test of a high-energy-storage rock mass in the present disclosure.
Figure 2:
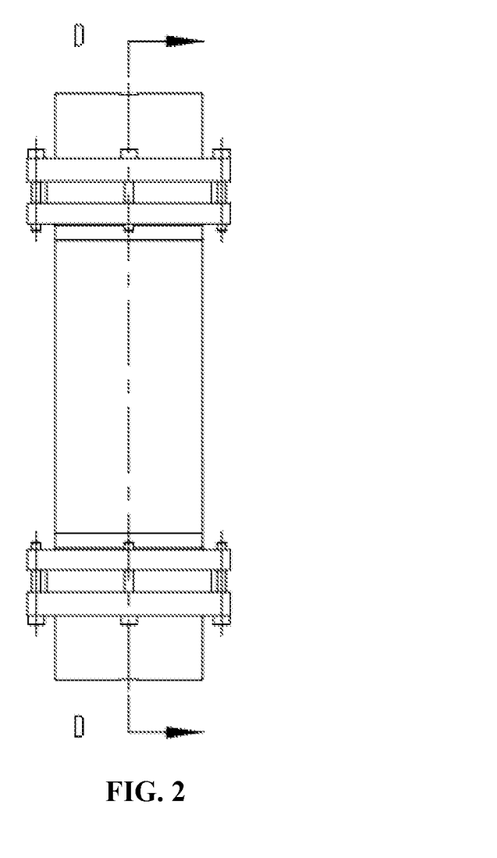
FIG. 2 is a front view schematic diagram of a pressure-bearing device for simulating an excavation unloading test of a high-energy-storage rock mass in the present disclosure.
Figure 3:
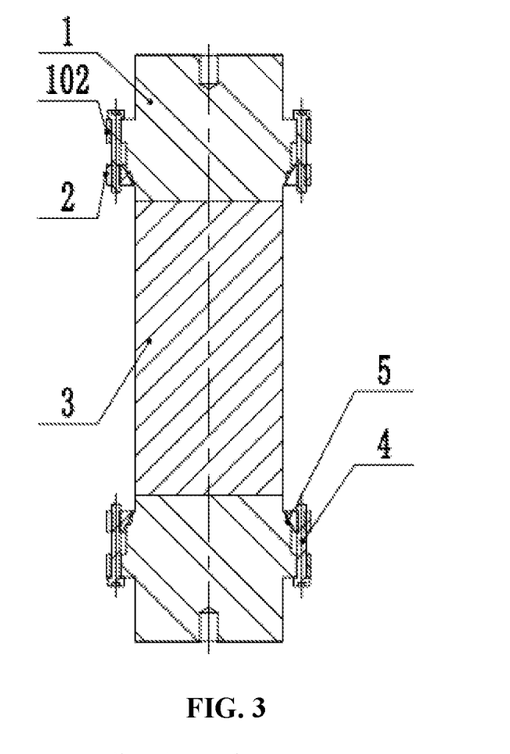
FIG. 3 is a sectioning schematic diagram of FIG. 2 along D-D direction.
Figure 4:
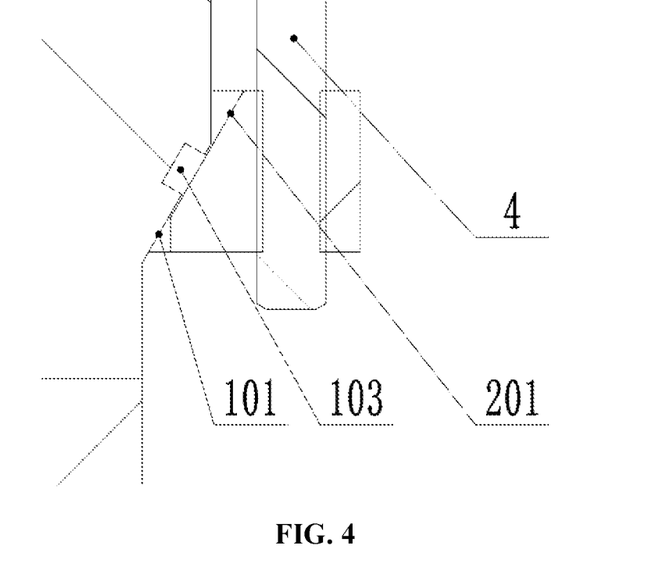
FIG. 4 is a partially structural amplified schematic diagram of a pressure-bearing device for simulating an excavation unloading test of a high-energy-storage rock mass in the present disclosure.

Referring to FIG. 1 to FIG. 4, FIG. 1 is an axonometric schematic diagram of a pressure-bearing device for simulating an excavation unloading test of a high-energy-storage rock mass in the present disclosure; FIG. 2 is a front view schematic diagram of a pressure-bearing device for simulating an excavation unloading test of a high-energy-storage rock mass in the present disclosure; FIG. 3 is a sectioning schematic diagram of FIG. 2 along D-D direction; and FIG. 4 is a partially structural amplified schematic diagram of a pressure-bearing device for simulating an excavation unloading test of a high-energy-storage rock mass in the present disclosure.

The present disclosure provides a pressure-bearing device for simulating an excavation unloading test of a high-energy-storage rock mass, comprising pressure-bearing blocks 1, a casing pipe and sealing rings 2. The number of the pressure-bearing blocks 1 is two, and the two pressure-bearing blocks 1 are respectively arranged at two ends of the to-be-tested rock mass 3; the casing pipe can be arranged outside the to-be-tested rock mass 3 and the pressure-bearing blocks 1 in a sleeving mode and can be attached to the to-be-tested rock mass 3 and the pressure-bearing blocks 1, and the casing pipe is made of a waterproof material; and the sealing rings 2 are arranged outside the pressure-bearing blocks 1 and the casing pipe in a sleeving mode, the sealing rings 2 correspond to the pressure-bearing blocks 1 in a one-to-one mode, the abutting surfaces of the sealing rings 2, the casing pipe and the pressure-bearing blocks 1 are inclined surfaces, fastening elements 4 are further arranged between the sealing rings 2 and the pressure-bearing blocks 1, the sealing ring 2 can be tightly pressed on the casing pipe and the pressure-bearing blocks 1 through the fastening elements 4; and the sealing ring 2 is made of a rigid material.

According to the pressure-bearing device for simulating an excavation unloading test of a high-energy-storage rock mass in the present disclosure, the casing pipe is arranged outside the to-be-tested rock mass 3 and the pressure-bearing blocks 1 in a sleeving mode to play a role in fixing the to-be-tested rock mass 3 and the pressure-bearing blocks 1, then, the sealing rings 2 are arranged outside the pressure-bearing blocks 1 and the casing pipe in a sleeving mode, the casing pipe is tightly attached to the to-be-tested rock mass 3 and the pressure-bearing blocks 1, namely, the sealing rings 2 are arranged outside the pressure-bearing blocks 1 and the to-be-tested rock mass 3 in a sleeving mode, and the sealing rings 2 can be tightly pressed on the pressure-bearing blocks 1, so that the end of the casing pipe is blocked, and the purpose of sealing is achieved. It needs to be emphasized that the sealing rings 2 are tightly pressed on the pressure-bearing blocks 1 through the fastening elements 4, the abutting surfaces of the sealing rings 1, the pressure-bearing blocks 1 and the casing pipe are inclined surfaces, the pressure-bearing block 1 abuts against the inclined surface of the sealing ring 2, the damage to the casing pipe caused by stress concentration at the contact position of the sealing ring 1 and the pressure-bearing block 1 is avoided, the sealing ring 2 is guaranteed to be tightly attached to the casing pipe, and the sealing effect is enhanced. In addition, the sealing rings 2 are promoted to be tightly pressed on the casing pipe and the pressure-bearing blocks 1 through the fastening elements 4, and the operation convenience is improved.

It needs to be explained that the casing pipe is arranged outside the to-be-tested rock mass 3 and the pressure-bearing blocks 1 in a sleeving mode and is tightly attached to the to-be-tested rock mass 3 and the pressure-bearing blocks 1, indicating that the casing pipe can be wrapped outside the to-be-tested rock mass 3 and the pressure-bearing blocks 1 and is completely attached to the to-be-tested rock mass 3 and the pressure-bearing blocks 1 without wrinkles. The casing pipe is connected with the pressure-bearing blocks 1 and the to-be-tested rock mass 3. Namely, a sealing layer is plated outside the to-be-tested rock mass 3 and the pressure-bearing blocks 1. The sealing rings 2 are arranged outside the casing in a sleeving mode. Namely, the sealing rings 2 are arranged outside the sealing layer of the pressure-bearing blocks 1 and the to-be-tested rock mass 3 in a sleeving mode. The influence on the appearance of the to-be-tested rock mass 3 and the pressure-bearing blocks 1 can be nearly ignored. Therefore, the sealing rings 2 involved in the present disclosure can be arranged outside the pressure-bearing blocks 1, the to-be-tested rock mass 3, the casing or any combination of the pressure-bearing blocks 1, the to-be-tested rock mass 3 and the casing, and the sealing rings 2 are tightly pressed on the casing pipe and the pressure-bearing blocks 1 or the sealing rings 2 are tightly pressed on the pressure-bearing blocks 1. In the specific embodiment, the casing pipe can be a heat-shrinkable pipe. After the casing pipe is arranged outside the to-be-tested rock mass 3 and the pressure-bearing blocks 1 in a sleeving mode, the heat-shrinkable pipe is heated, so that the heat-shrinkable pipe is deformed to be tightly attached to the to-be-tested rock mass 3 and the pressure-bearing blocks 1. In other specific embodiments of the present disclosure, the casing pipe can also be made of an elastic material. The casing pipe made of an elastic material is arranged outside the to-be-tested rock mass 3 and the pressure-bearing blocks 1 in a sleeving mode, and the sealing rings 2 are tightly pressed on the pressure-bearing blocks 1 through the fastening elements 4, so that the end of the casing pipe is blocked, and the sealing effect is achieved. In addition, the length of the casing pipe needs to meet the requirement that the sealing rings 2 can be pressed and sealed, the end of the casing pipe can be selectively located on the abutting surface of the sealing rings 2 and the pressure-bearing blocks 1. Or, the casing pipe is slightly longer and extends out of the sealing rings 2. The length of the casing pipe can be set according to specific test requirements. In addition, the casing pipe is not shown in the attached figures because the casing in the specific embodiment is capable of deforming.

Specifically, the pressure-bearing block 1 is provided with a first inclined surface 101, the first inclined surface 101 extends from the first end, away from the to-be-tested rock mass 3, of the pressure-bearing block 1 to the second end, close to the to-be-tested rock mass 3, of the pressure-bearing block 1, and the pressure-bearing block 1 is obliquely arranged towards the axis direction of the pressure-bearing block 1; the sealing ring 2 is provided with a second inclined surface 201, and the second inclined surface 201 can abut against the first inclined surface 101 and the casing pipe; and acting force can be applied to the sealing rings 2 in the direction away from the to-be-tested rock mass 3 through the fastening elements 4. Acting force is applied to the sealing rings 2 through the fastening elements 4, so that the sealing rings 2 are tightly pressed on the pressure-bearing blocks 1, and the inclined surface abuts against the pressure-bearing block 1 to avoid stress concentration. The slopes of the first inclined surface 101 and the second inclined surface 201 can be selected to be the same or similar, and the sealing effect is guaranteed. In the specific embodiment, the first inclined surface 101 and the second inclined surface 201 are inclined towards the middle part of the to-be-tested rock mass 3 from two ends. In other specific embodiments of the present disclosure, the inclined directions of the first inclined surface 101 and the second inclined surface 201 can be adjusted, the direction of applying acting force to the sealing rings 2 through the fastening elements 4 can be correspondingly adjusted, and the casing pipe, the fastening elements 4, the pressure-bearing blocks 1 and the like are adaptively adjusted.

Wherein, a sealing groove 103 is formed in the pressure-bearing block 1, an opening of the sealing groove 103 is formed in the first inclined surface 101, a sealing ring 5 is arranged in the sealing groove 103, and the sealing ring 5 abuts against the second inclined surface 201. The sealing ring 5 abuts against the sealing ring 2. The sealing ring 5 and the sealing ring 2 are more flexible and natural in contact. The damage to the casing pipe is further avoided from being accelerated due to stress concentration at the contact position of the sealing ring 2 and the pressure-bearing block 1, so that tight attachment of the pressure-bearing blocks 1, the casing pipe and the sealing rings 2 is guaranteed, and the sealing effect of the device is enhanced. The sealing ring 5 can be an O-shaped ring or a sealing ring 5 of other structures, and the shape of the sealing groove 103 is matched with that of the sealing ring 5.

More specifically, the pressure-bearing block 1 is provided with a boss 102, the boss 102 is arranged on the side, away from the to-be-tested rock mass 3, of the sealing ring 2, a gap is formed between the boss 102 and the sealing ring 2, and the boss is connected with the sealing ring 2 through the fastening elements 4. The boss 102 provides an installation foundation for the fastening elements 4. The axis of the boss 102 coincides with the axis of the to-be-tested rock mass 3. The fastening elements 4 are connected with the boss 102 so that the axis of the fastening element 4 can be parallel to the axis of the to-be-tested rock mass 3, acting force parallel to the axis of the to-be-tested rock mass 3 is guaranteed to be applied to the sealing rings 2 only through the fastening elements 4, the fastening elements 4 are prevented from interfering with the test, and the reliability of the test result is improved.

In the specific embodiment, the fastening element 4 is a bolt, through holes matched with the fastening elements 4 are formed in the boss 102, bolt holes matched with the fastening elements 4 are formed in the sealing ring 2, and the fastening elements 4 penetrate through the boss 102 and then are in threaded connection with the sealing ring 2. The magnitude of the acting force applied to the sealing rings 2 through the fastening elements 4 can be adjusted by adjusting the connecting positions of the fastening elements 4 and the sealing rings 2. The threaded connection mode is adopted, so that the operation convenience is improved, and even testers with small strength can conveniently operate the sealing rings 2.

In addition, the number of the fastening elements 4 is four, and the four fastening elements 4 are circumferentially and uniformly distributed around the axis of the pressure-bearing block 1, so that the stress uniformity of the sealing ring 2 is improved, and the structural stability of the whole device is improved.

Further, a groove 104 is formed in the radial end face of the end, away from the to-be-tested rock mass 3, of the pressure-bearing block 1, the groove 104 is of a structure with an opening in the top, and the groove 104 extends to the side wall of the pressure-bearing block 1. The groove 104 is formed in the pressure-bearing block 1. The situation that the device and a test loading system are difficult to be instantly separated due to the existence of a hydraulic oil film under the high-confining-pressure loading and unloading conventional triaxial test condition of the to-be-tested rock mass 3 can be prevented, so that disturbance to the rock mass after the test is effectively avoided.

In the specific embodiment, the groove 104 is cross-shaped, the adsorption phenomenon of the hydraulic oil film is further avoided, and the cross-shaped connecting line of the four fastening elements 4 coincides with the projection of the groove 104, so that the structural symmetry is improved, and then the stress uniformity of the device is guaranteed.

Furthermore, the present disclosure further provides a sealing method for simulating an excavation unloading test of a high-energy-storage rock mass, specifically comprising the following operation steps:

inversely arranging one of the pressure-bearing blocks 1 on a test loading system;

placing to-be-tested rock mass 3 on the pressure-bearing block 1 until the axis of the to-be-tested rock mass 3 coincides with the axis of the pressure-bearing block 1;

arranging a heat-shrinkable pipe outside the to-be-tested rock mass 3 and the pressure-bearing blocks 1 in a sleeving mode;

oppositely arranging two sealing rings 2 outside the heat-shrinkable pipe and the pressure-bearing blocks 1 in a sleeving mode;

placing the other pressure-bearing block 1 on the to-be-tested rock mass 3, so that the pressure-bearing blocks 1 extends into the heat-shrinkable pipe, and the two pressure-bearing blocks 1 and the to-be-tested rock mass 3 are coaxially arranged;

heating the heat-shrinkable pipe by a heating gun or other heating equipment, so that the heated heat-shrinkable pipe is rapidly shrunk and tightly attached to the two pressure-bearing blocks 1; and connecting the two sealing rings 2 with the pressure-bearing blocks 1 through the fastening elements 4, so that the pressure-bearing blocks 1 and the sealing rings 5 on the pressure-bearing blocks 1 are tightly pressed through the sealing rings 2, and the condition that oil leaks from the upper part and the lower part of the to-be-tested rock mass 3 in the high-confining-pressure loading and unloading conventional triaxial test process is prevented.

According to the sealing method for simulating an excavation unloading test of a high-energy-storage rock mass in the present disclosure, the combination of the sealing rings 2 and the fastening elements 4 is used for sealing the to-be-tested rock mass 3 and the pressure-bearing blocks 1. Compared with the prior art, the weight of sealing accessories of the device is reduced, and operation of testers is facilitated. Especially, great convenience is provided for the sealing operation of a large-size rock mass high-confining-pressure loading and unloading conventional triaxial test by the testers with small strength.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A pressure-bearing device for simulating an excavation unloading test of a high-energy-storage rock mass, comprising:
pressure-bearing blocks, the number of the pressure-bearing blocks being two, and the two pressure-bearing blocks being respectively arranged at two ends of a to-be-tested rock mass; a groove being formed in the radial end face of the end, away from the to-be-tested rock mass, of the pressure-bearing block, the groove being of a structure with an opening in the top, and the groove extending to the side wall of the pressure-bearing block;
a casing pipe, the casing pipe being arranged outside the to-be-tested rock mass and the pressure-bearing blocks in a sleeving mode and being attached to the to-be-tested rock mass and the pressure-bearing blocks, and the casing pipe being made of a waterproof material; and
sealing rings, the sealing rings being arranged outside the pressure-bearing blocks and the casing pipe in a sleeving mode, the sealing rings corresponding to the pressure-bearing blocks in a one-to-one mode, the abutting surfaces of the sealing rings, the casing pipe and the pressure-bearing blocks being inclined surfaces, fastening elements being further arranged between the sealing rings and the pressure-bearing blocks, the sealing ring being tightly pressed on the casing pipe and the pressure-bearing blocks through the fastening elements, and the sealing ring being made of a rigid material.

2. The pressure-bearing device for simulating an excavation unloading test of a high-energy-storage rock mass according to claim 1, wherein the pressure-bearing block is provided with a first inclined surface, the first inclined surface extends from the first end, away from the to-be-tested rock mass, of the pressure-bearing block to the second end, close to the to-be-tested rock mass, of the pressure-bearing block, and the pressure-bearing block is obliquely arranged towards the axis direction of the pressure-bearing block; the sealing ring is provided with a second inclined surface, and the second inclined surface can abut against the first inclined surface and the casing pipe; and acting force can be applied to the sealing rings in the direction away from the to-be-tested rock mass through the fastening elements.

3. The pressure-bearing device for simulating an excavation unloading test of a high-energy-storage rock mass according to claim 2, wherein a sealing groove is formed in the pressure-bearing block, an opening of the sealing groove is formed in the first inclined surface, a sealing ring is arranged in the sealing groove, and the sealing ring abuts against the second inclined surface.

4. The pressure-bearing device for simulating an excavation unloading test of a high-energy-storage rock mass according to claim 2, wherein the pressure-bearing block is provided with a boss, the boss is arranged on the side, away from the to-be-tested rock mass, of the sealing ring, a gap is formed between the boss and the sealing ring, and the boss is connected with the sealing ring through the fastening elements.

5. The pressure-bearing device for simulating an excavation unloading test of a high-energy-storage rock mass according to claim 4, wherein the fastening element is a bolt, through holes matched with the fastening elements are formed in the boss, bolt holes matched with the fastening elements are formed in the sealing ring, and the fastening elements penetrate through the boss and then are in threaded connection with the sealing ring.

6. The pressure-bearing device for simulating an excavation unloading test of a high-energy-storage rock mass according to claim 5, wherein the number of the fastening elements is four, and the four fastening elements are circumferentially and uniformly distributed around the axis of the pressure-bearing block.

7. The pressure-bearing device for simulating an excavation unloading test of a high-energy-storage rock mass according to claim 6, wherein the groove is cross-shaped, and the cross-shaped connecting line of the four fastening elements coincides with the projection of the groove.

8. A sealing method for simulating an excavation unloading test of a high-energy-storage rock mass, utilizing the pressure-bearing device for simulating an excavation unloading test of a high-energy-storage rock mass according to claim 1, wherein the two pressure-bearing blocks are symmetrically arranged at two ends of the to-be-tested rock mass, the casing pipe is arranged outside the to-be-tested rock mass and the pressure-bearing blocks in a sleeving mode, the casing pipe is tightly attached to the to-be-tested rock mass and the pressure-bearing blocks, the sealing rings are arranged outside the pressure-bearing blocks and the casing pipe in a sleeving mode, and the sealing rings are tightly pressed on the casing pipe and the pressure-bearing blocks through the fastening elements.

9. The sealing method for simulating an excavation unloading test of a high-energy-storage rock mass according to claim 8, wherein the pressure-bearing block is provided with a first inclined surface, the first inclined surface extends from the first end, away from the to-be-tested rock mass, of the pressure-bearing block to the second end, close to the to-be-tested rock mass, of the pressure-bearing block, and the pressure-bearing block is obliquely arranged towards the axis direction of the pressure-bearing block; the sealing ring is provided with a second inclined surface, and the second inclined surface can abut against the first inclined surface and the casing pipe; and acting force can be applied to the sealing rings in the direction away from the to-be-tested rock mass through the fastening elements.

10. The sealing method for simulating an excavation unloading test of a high-energy-storage rock mass according to claim 9, wherein a sealing groove is formed in the pressure-bearing block, an opening of the sealing groove is formed in the first inclined surface, a sealing ring is arranged in the sealing groove, and the sealing ring abuts against the second inclined surface.

11. The sealing method for simulating an excavation unloading test of a high-energy-storage rock mass according to claim 10, wherein the pressure-bearing blocks and the to-be-tested rock mass are coaxially arranged.

12. The sealing method for simulating an excavation unloading test of a high-energy-storage rock mass according to claim 9, wherein the pressure-bearing block is provided with a boss, the boss is arranged on the side, away from the to-be-tested rock mass, of the sealing ring, a gap is formed between the boss and the sealing ring, and the boss is connected with the sealing ring through the fastening elements.

13. The sealing method for simulating an excavation unloading test of a high-energy-storage rock mass according to claim 12, wherein the fastening element is a bolt, through holes matched with the fastening elements are formed in the boss, bolt holes matched with the fastening elements are formed in the sealing ring, and the fastening elements penetrate through the boss and then are in threaded connection with the sealing ring.

14. The sealing method for simulating an excavation unloading test of a high-energy-storage rock mass according to claim 13, wherein the number of the fastening elements is four, and the four fastening elements are circumferentially and uniformly distributed around the axis of the pressure-bearing block.

15. The sealing method for simulating an excavation unloading test of a high-energy-storage rock mass according to claim 14, wherein the groove is cross-shaped, and the cross-shaped connecting line of the four fastening elements coincides with the projection of the groove.

16. The sealing method for simulating an excavation unloading test of a high-energy-storage rock mass according to claim 14, wherein the pressure-bearing blocks and the to-be-tested rock mass are coaxially arranged.

17. The sealing method for simulating an excavation unloading test of a high-energy-storage rock mass according to claim 13, wherein the pressure-bearing blocks and the to-be-tested rock mass are coaxially arranged.

18. The sealing method for simulating an excavation unloading test of a high-energy-storage rock mass according to claim 12, wherein the pressure-bearing blocks and the to-be-tested rock mass are coaxially arranged.

19. The sealing method for simulating an excavation unloading test of a high-energy-storage rock mass according to claim 9, wherein the pressure-bearing blocks and the to-be-tested rock mass are coaxially arranged.

20. The sealing method for simulating an excavation unloading test of a high-energy-storage rock mass according to claim 8, wherein the pressure-bearing blocks and the to-be-tested rock mass are coaxially arranged.

* * * * *